United States Patent
Pandey et al.

(10) Patent No.: US 11,757,975 B1
(45) Date of Patent: Sep. 12, 2023

(54) SYSTEMS AND METHODS FOR MONITORING A FILE DOWNLOAD

(71) Applicant: Sophos Limited, Abingdon (GB)

(72) Inventors: Rahul Pandey, Abingdon (GB); Shankar Jayaraman, Bangalore (IN); Santosh Subramanya, Bangalore (IN); Dhwanit Shah, Abingdon (GB); Guy Roberts, Milton Keynes (GB)

(73) Assignee: Sophos Limited

( * ) Notice: Subject to any disclaimer, the term of this patent is extended or adjusted under 35 U.S.C. 154(b) by 0 days.

(21) Appl. No.: 18/078,336

(22) Filed: Dec. 9, 2022

(51) Int. Cl.
*H04L 67/06* (2022.01)
*H04L 67/025* (2022.01)

(52) U.S. Cl.
CPC ............ *H04L 67/06* (2013.01); *H04L 67/025* (2013.01)

(58) Field of Classification Search
None
See application file for complete search history.

(56) References Cited

U.S. PATENT DOCUMENTS

| | | | | |
|---|---|---|---|---|
| 9,459,766 | B1 * | 10/2016 | Haynes | G06F 3/04817 |
| 9,996,697 | B2 * | 6/2018 | Mahaffey | H04L 63/123 |
| 2011/0145920 | A1 * | 6/2011 | Mahaffey | H04W 12/12 726/22 |
| 2011/0162070 | A1 * | 6/2011 | Krasser | G06F 21/564 726/23 |
| 2016/0099963 | A1 * | 4/2016 | Mahaffey | G06F 21/554 726/25 |
| 2016/0125184 | A1 * | 5/2016 | Mahaffey | H04W 12/12 726/22 |
| 2019/0222591 | A1 * | 7/2019 | Kislitsin | H04L 63/1416 |

* cited by examiner

*Primary Examiner* — Quang N Nguyen
(74) *Attorney, Agent, or Firm* — Danielson Legal LLC

(57) ABSTRACT

Systems and methods for monitoring a file download. The methods include communicating, using a first device, a request to download a file from a source; receiving at the first device a first plurality of packets related to the file; modifying the first plurality of packets to create a second plurality of packets; and communicating the second plurality of packets to a second device configured to reassemble the second plurality of packets, extract the file from the reassembled second plurality of packets, and obtain behavioral data associated with the file. The methods further include receiving at the first device the behavioral data associated with the file, and implementing a download decision based on the behavioral data associated with the file, wherein the implemented download decision indicates at least whether the first device downloads the file.

18 Claims, 6 Drawing Sheets

US 11,757,975 B1

SYSTEMS AND METHODS FOR MONITORING A FILE DOWNLOAD

CROSS-REFERENCE TO RELATED APPLICATIONS

The present application is related to U.S. patent application Ser. No. 18/078,186, filed Dec. 9, 2022, the content of which is hereby incorporated by reference as if set forth in its entirety herein.

TECHNICAL FIELD

The present application relates generally to systems and methods for detecting malicious network activity and, more particularly but not exclusively, to systems and methods for protecting network devices from malicious files.

BACKGROUND

Operators of user devices such as smartphones, tablets, laptops, or the like may download files for a variety of purposes. A user may use their device to download files such as those associated with documents, games, email services, browsers, tools or services, social media platforms, or the like.

These files are sometimes subject to a variety of security reviews, especially when they are delivered through trusted sources. However, it is a matter of public record that even trusted sources have served as vectors for the delivery of files that have included malware, spyware, or other undesirable functionality.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for monitoring a file download. Specifically, the systems and methods herein may evaluate a requested file before a first device downloads the file.

The first device may request to download a file from a source, and may receive a plurality of packets as part of the file download process. The first device may modify the received data packets and forward the modified data packets to a second device such as a backend server. The second device may then reassemble the modified packets and extract the file therefrom.

The second device may analyze the file to obtain behavioral data associated with the file. For example, the second device may execute the file in a sandbox environment to gather data regarding how the file behaves when executed. The second device may then calculate and assign a risk score to the file based on the obtained behavioral data.

The embodiments herein may then implement a download decision based on the assigned risk score. The download decision may indicate at least whether the first device is able to download the file associated with the request.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
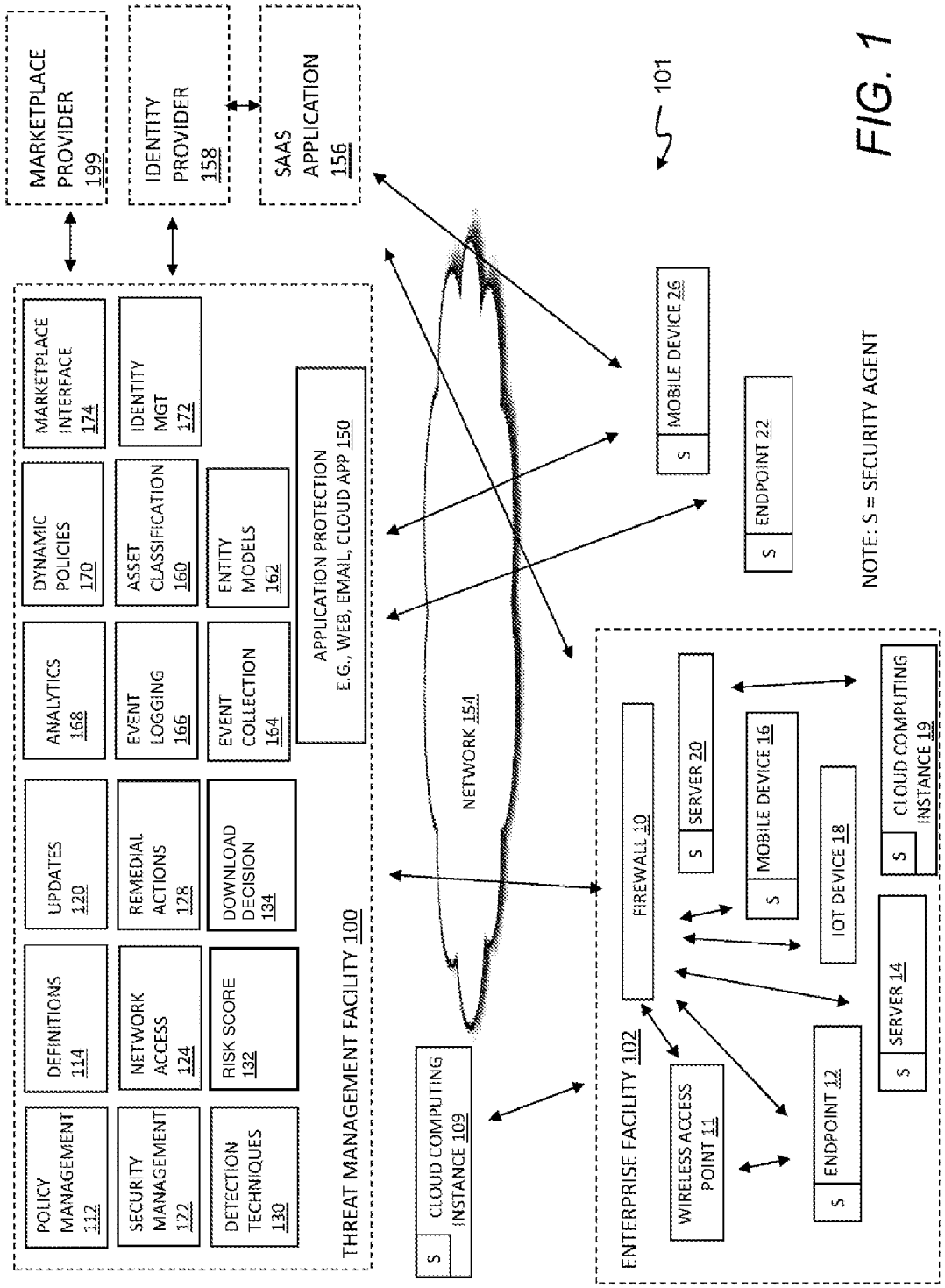
FIG. 1 illustrates a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic)

quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In some instances, operating systems can only evaluate a file after it is downloaded on a user device. However, the file may immediately start exfiltrating data or performing other malicious actions as soon as it is downloaded.

The embodiments described herein overcome these disadvantages by evaluating a file at a location separate from the user device and before the user device installs the file. Additionally, the described embodiments are file-, device-, and platform-agnostic. That is, the described embodiments are not limited to analyzing any particular type of file, using any particular device, or using any particular software platform.

Sources often require authentication before allowing a device to download a file. For example, a user may need to provide credentials to a source before they are able to download a file. While a user may be able to provide these credentials using their device, backend servers and related components generally would not be able to authenticate with the source. For example, the above-described second device such as a backend server may not have the required credentials to download a file from the source.

Accordingly, the embodiments herein also address this challenge by having the first device authenticate with the with the source. As discussed above, the first device may then, once authenticated, receive packets associated with file and forward the modified packets to the second device. In this way, the first device acts as an intermediary to receive packets associated with a file. The first device then forwards the required packets to the second device, which would otherwise be unable to receive the packets directly from the source.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

The threat management facility 100 may execute one or more modules or facilities to analyze files that have been requested for download by a user device. For example, the threat management facility 100 may be tasked with monitoring and ensuring the security of devices on an enterprise facility 102. Upon a device on the enterprise facility 102 requesting to download a file, the threat management facility 100 or components thereof may analyze the file to determine whether the device is permitted to download the file.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, risk score module 132, download decision module 134, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 may inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data is made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12,14,18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that may be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22,26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19,109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so they may be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102 as identified by one or more of the facilities such as the policy management facility 112, security management facility 122, update facility 120, definitions facility 114, network access facility 124, detection techniques facility 130, a risk score module 132, a decision module 134, application protection 150, asset classification facility 160, entity model facility 162, event collection facility 164, event logging facility 166, analytics facility 168, dynamic policies facility 170, identity management facility 172, as well as other facilities.

For example, the risk score module 132 may, as discussed below with reference to FIGS. 2-6, calculate and assign a risk score to a file requested for download by a device on the enterprise facility 102. The download decision module 134 may then implement a download decision indicating at least whether the device is able to download the file associated with the request.

As discussed previously, users of user devices such as smartphones, tablets, personal computers (PCs), laptops, smart appliances, Internet-of-Things (IoT) devices may download files to their device from sources such as browsers, websites, application stores, or the like.

Generally, operating systems executing on these user devices detect whether a file is malicious or otherwise harmful only after it is downloaded on the device. At this point, however, a malicious file such as one associated with a malicious application may have already performed some harmful actions in furtherance of a malicious campaign. For example, a malicious file may attempt to contact a command-and-control server and begin exfiltrating data from the device.

Figure 2:
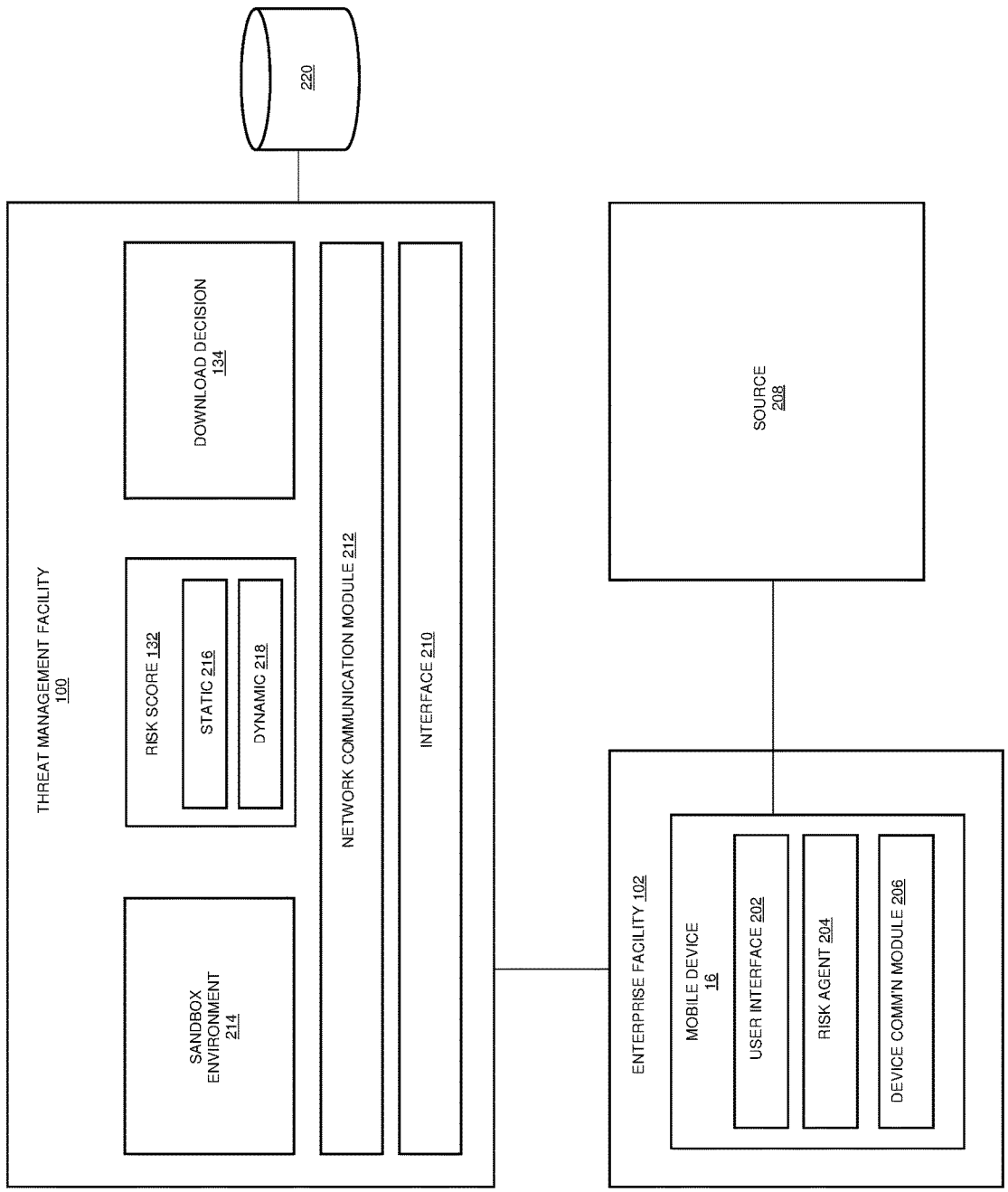
FIG. 2 illustrates a portion of the threat management system of FIG. 1 in accordance with one embodiment.

The embodiments described herein may determine whether a file is at least potentially malicious before it is downloaded to a user device. FIG. 2 illustrates a portion of the threat management facility 100 of FIG. 1 in communication with a mobile device 16 of the enterprise facility 102. The mobile device 16 may include a user interface 202, a risk agent 204, and a device communication module 206.

The mobile device 16 may be, for example, a company-issued smartphone provided to a user such as an employee. Although the enterprise facility 102 is illustrated as including a mobile device 16 (e.g., a smartphone), the embodiments herein are not limited to such devices or associated, operating platforms. For example, other types of devices such as tablets, laptops, personal computers, smart appliances, wearable devices, IoT devices, or any other type of device able to download a file may be used in accordance with the embodiments described herein.

FIG. 2 also illustrates a source 208, the threat management facility 100 with an interface 210, network communication module 212, a sandbox environment 214, the risk score module 132, and the download decision module 134. The risk score module 132 may include a static analysis module 216 and a dynamic analysis module 218.

The threat management facility 100 or components thereon may also be in communication with one or more databases 220. The database(s) 220 may store data regarding files, such as hashes associated with files.

The sandbox environment 214 may be implemented by one or more virtual machines executed by any appropriate virtualization technology. These virtual machines may execute on physical infrastructure comprising Type 1 or Type 2 hypervisors. Additionally and/or alternatively, the sandbox environment 214 may be implemented as a container-based architecture, such as Kubernetes, Docker, or the like.

The risk score module 132 or analysis modules thereof may be implemented using one or more computer-programming and/or scripting languages. These may include, but are not limited to, C, C++, Java, Python, Perl, Javascript, or the like.

Similarly, the download decision module 134 may be implemented using one or more computer-programming and/or scripting languages. These may include, but are not limited to, C, C++, Java, Python, Perl, JavaScript, or the like.

In operation, the user of the mobile device 16 may request to download a file from a source 208. The source 208 may be any type of source such as a website, a browser, store, database, or the like. As discussed previously, there may be risks associated with a requested file, particularly a file from unknown or non-legitimate locations.

As discussed above, the mobile device 16 may need to first authenticate with the source 208. For example, the mobile device 16 or the user of the mobile device 16 may first need to provide, e.g., a username, a password, or other type of credential(s). The mobile device 16 or the user of the mobile device 16 may also need to perform other type(s) of authentication procedures such as a multi-factor authentication procedure before downloading the requested file from the source 208.

Although the mobile device 16 may provide these credentials, components associated with the threat management facility 100 may be unable to authenticate with the source 208. For example, a server executing one or more of the risk score module 132 or the download decision module 134 may not have the appropriate credentials, authorization, or the like. As a result, the threat management facility 100 or associated facilities or components may be unable to download files directly from the source 208. Accordingly, the mobile device 16 or other type of device that is able to authenticate may initiate the file download process.

The interface 210 may be implemented as a port or socket able to receive communications sent from the enterprise facility 102 or the mobile device 16. In some embodiments, the interface 210 may be implemented as a hardware interface such as a fiber optic interface, Universal Serial Bus (USB) interface, Ethernet interface, or any other type of interface whether available now or invented hereafter. The network communication module 212 may receive the packets once they are received at the interface 210.

The components of the threat management facility 100 may be located on-premise with the enterprise facility 102 or at a location remote from the enterprise facility, such as a cloud-based or a software-as-a-service (SAAS) provider. For on-premise deployments, the entity associated with the enterprise facility 102 may host the components of the threat management facility 100.

An administrator associated with the threat management facility 100 or the enterprise facility 102 may install the risk agent 204 on the mobile device 16 and configure the risk agent 204 with root privileges. This allows the risk agent 204 to intercept network traffic from the source 208. This traffic may include, for example, Hypertext Transfer Protocol (HTTP) traffic and secure Hypertext Transfer Protocol (HTTPS) traffic. In the case of encrypted or secure traffic, the risk agent 204 may perform any appropriate decryption procedures on the encrypted traffic. In some embodiments, the traffic may include plain text data.

As the risk agent 204 has visibility into network traffic, the risk agent 204 can identify or otherwise receive connection data such as packets, uniform resource locator (URL) information, response headers, or the like. After the risk agent 204 receives packets associated with the requested file, the risk agent 204 may extract the payload from each packet and drop the packet. For example, the risk agent 204 may extract data such as the file name, domain name, internet protocol (IP) address, the location from where the packet was sent, or the like.

The risk agent 204 may then perform any appropriate modifications to the received plurality of packets. For example, each packet from the source 208 may have a Source attribute, the value of which is the internet protocol (IP) address of the source 208. Similarly, each packet from the source 208 may have a Destination attribute, the value of which is the IP address of the mobile device 16. In other words, these parameters indicate from where a packet was sent and the packet's destination.

The risk agent 204 may modify these parameters for each packet to create modified packets to be sent to the threat management facility 100. For example, the risk agent 204 may change the value of the Destination attribute from the IP address of the mobile device 16 to the IP address of the threat management facility 100. Similarly, the risk agent 204 may change the value of the Source attribute to the IP address of the mobile device 16.

The device communication module 206 may establish a connection to the network communication module 212. For example, the network communication module 212 may listen on a dedicated port in the threat management facility 100. When a connection is initiated from the first device 16 or otherwise from the enterprise facility 102, the connection is accepted and established. The device communication module 206 may then send the modified packets to the network communication module 212.

The mobile device 16 therefore acts as an intermediary so the threat management facility 100 can receive and analyze the requested file. The authentication of the mobile device 16 allows the mobile device 16 to receive the data packets associated with the requested file from the source 208. The mobile device 16 may extract the payload from the packets, drop the packets, and create new, modified packets. The mobile device 16 may then forward the packets, albeit modified versions thereof, to the threat management facility 100.

The network communication module 212 may then reassemble the received, modified packets. Although the packets may arrive in a different order from which they are sent, the packets may be labeled such that the network communication module 212 can reassemble the packets in an appropriate order. The term "reassemble" in the context of the present application may refer to the process of combining received packets such that the file can be extracted therefrom.

Once the packets are received and reassembled at the threat management facility 100, the network communication module 212 may execute a Secure Hash Algorithm (SHA) such as hash functions associated with the SHA-2 or SHA-3 families to generate a hash pertaining to the file. The threat management facility 100 may then consult the database 220, which may store hashes or known files. If there is a match between the generated hash and a hash stored in the database 220, the network communication module 212 may conclude that the requested file is known or has at least been previously reviewed. For example, the calculated hash may match a stored hash that is associated with a known, legitimate file.

If there is no match between a generated hash and one stored in the database 220, it may suggest that the threat management facility 100 is unfamiliar with the file. The threat management facility 100 may then analyze the unknown file to obtain behavioral data associated with the file. For example, the threat management facility 100 may execute the file in the sandbox environment 214 to obtain behavioral data associated with the file.

Figure 3:
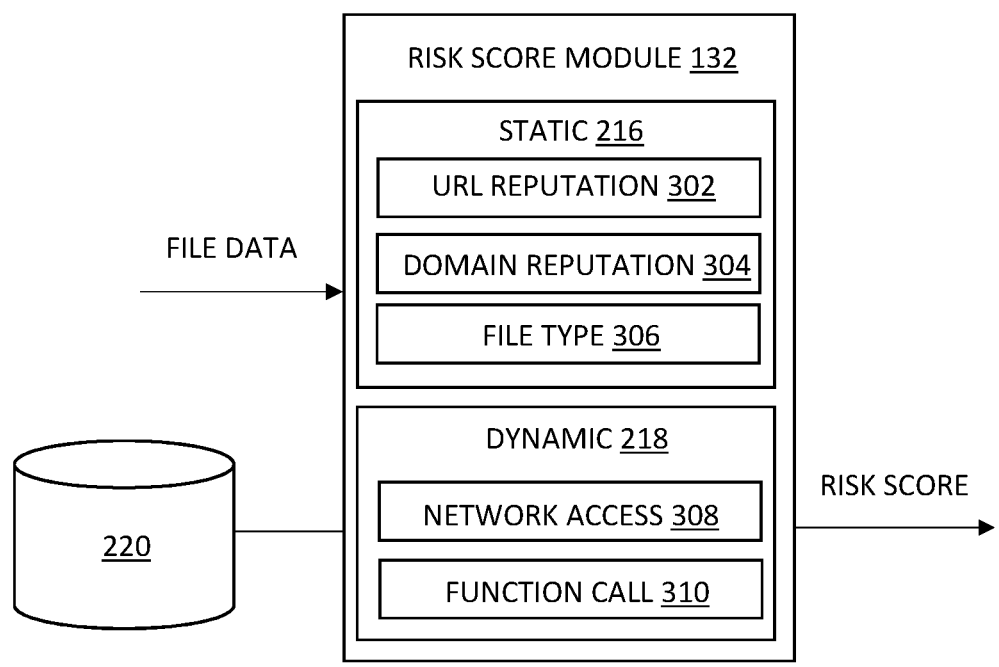
FIG. 3 illustrates the risk score module of FIG. 2 in accordance with one embodiment.

FIG. 3 illustrates the risk score module 132 of FIGS. 1 and 2 in more detail in accordance with one embodiment. As seen in FIG. 3, the risk score module 132 may execute a static analysis module 216, a dynamic analysis module 218, or both. The static analysis module 216 may obtain or otherwise analyze static data about the file and the dynamic analysis module 218 may obtain or otherwise analyze dynamic data about the file.

The static analysis module 216 may consider data such as, for example and without limitation, function calls, the general format and appearance of assembly code, metadata associated with the file, or the like. Files or associated applications may be built using high-level programming languages such as, but not limited to, C, C++, Java, Python, Perl, JavaScript, or the like. This language will be converted to a low-level assembly language, referred to as assembly code. The static analysis module 216 may perform its analysis on this assembly code, for example.

In some embodiments, a uniform resource locator (URL) reputation submodule 302 may analyze the reputation of a URL associated with the file. The URL reputation submodule 302 may reference a data structure in the database 220 such as a table or list of known, malicious URLs. The reputation submodule 302 may compare a URL associated with the file to determine if it matches a known, malicious URL stored in one or more databases 220, or is at least similar enough to a known malicious URL to warrant suspicion.

A domain reputation submodule 304 may analyze the reputation of a domain associated with the file. For example, the database 220 may include a data structure such as a table or a list storing known, malicious domains. The domain reputation submodule 304 may compare a domain associated with a file with the lists or tables of known, malicious domains to determine whether the domain associated with the file matches or is at least similar enough to a known, malicious domain to warrant suspicion.

A file type(s) submodule 306 may consider the type of file(s). The file type sub-module 306 may reference a data structure in the database 220 such as a table or a list of file types commonly associated with malware. Malware may execute through file types such as executable files (".exe"), Rich Text Format ("RTF") files, and Virtual Basic Script ("VBS") files. Accordingly, the file type submodule 306 may compare the type of file with types commonly associated with malware. If an analyzed file is of the same type as file types that are commonly associated with malware, it may suggest the file could be used for a malicious purpose or is at least suspicious.

The dynamic analysis module 216 may analyze the file or an associated application's execution in the sandbox environment 214. For example, the dynamic analysis module 216 may include a network access sub-module 308 to determine whether one or more of executed applications associated with the file has network access, and a function call submodule 310 to detect and analyze any function calls. Other types of dynamic data, whether available now or invented hereafter, and in addition to or in lieu of the data above may be considered to accomplish the objectives of the embodiments herein.

The risk score module 132 may then calculate a risk score for the file based on its behavioral data. The risk score may represent whether the file is malicious, the probability of the file being malicious, the degree to which the file is malicious, or the like.

For example, each submodule 302-10 may output a "vote" of whether its associated property indicates or likely indicates the file is malicious. The score may be based on a cumulative number of votes, for example. Additionally, or alternatively, each of the behavioral properties may be weighted. For example, if a particular property is heavily weighted, the risk score module 132 may calculate a higher score even if the heavily weighted behavioral property is the only one that suggests the file is malicious.

Accordingly, in some embodiments the risk score may be a weighted average, and the risk score module 132 may calculate the weighted average W by:

$$W = \frac{\sum_{i=1}^{n} \omega_i X_i}{\sum_{i=1}^{n} \omega_i}$$

where: W is the calculated weighted average (i.e., the overall score):
n is the number of individual property scores to be averaged,
$\omega_i$ are the weights applied to each property score, and
$X_i$ is the data values to be averaged.

The weights assigned to each of the above-discussed properties may vary and may depend on the file, the environment, the security vendor's preferences, or some combination thereof. For example, a security vendor may place higher weights on properties such as URL reputation and file reputation, as these properties may tend to accurately classify a file. That is, if the URL associated with a file under analysis matches a URL that is known to be malicious, there is a high likelihood that the analyzed file is malicious.

On the other hand, a security vendor may assign a lower weight (e.g., less than 1.0) to properties that may not be as accurate in predicting whether a file is associated with malicious activity. For example, executable files are commonly used in operating systems, and their presence may not necessarily be indicative of malicious activity.

Referring back to FIG. 2, the download decision module 134 may then implement a download decision based on the calculated risk score. For example, the download decision module 134 may prevent the mobile device 16 from downloading the file. Additionally and/or alternatively, the download decision module 134 may communicate the risk score to the mobile device 16. The user interface 202 of the mobile device 16 may present to the user the risk score in an easy-to-understand format. The user may then decide for themselves whether to proceed with downloading the file.

Figure 4:
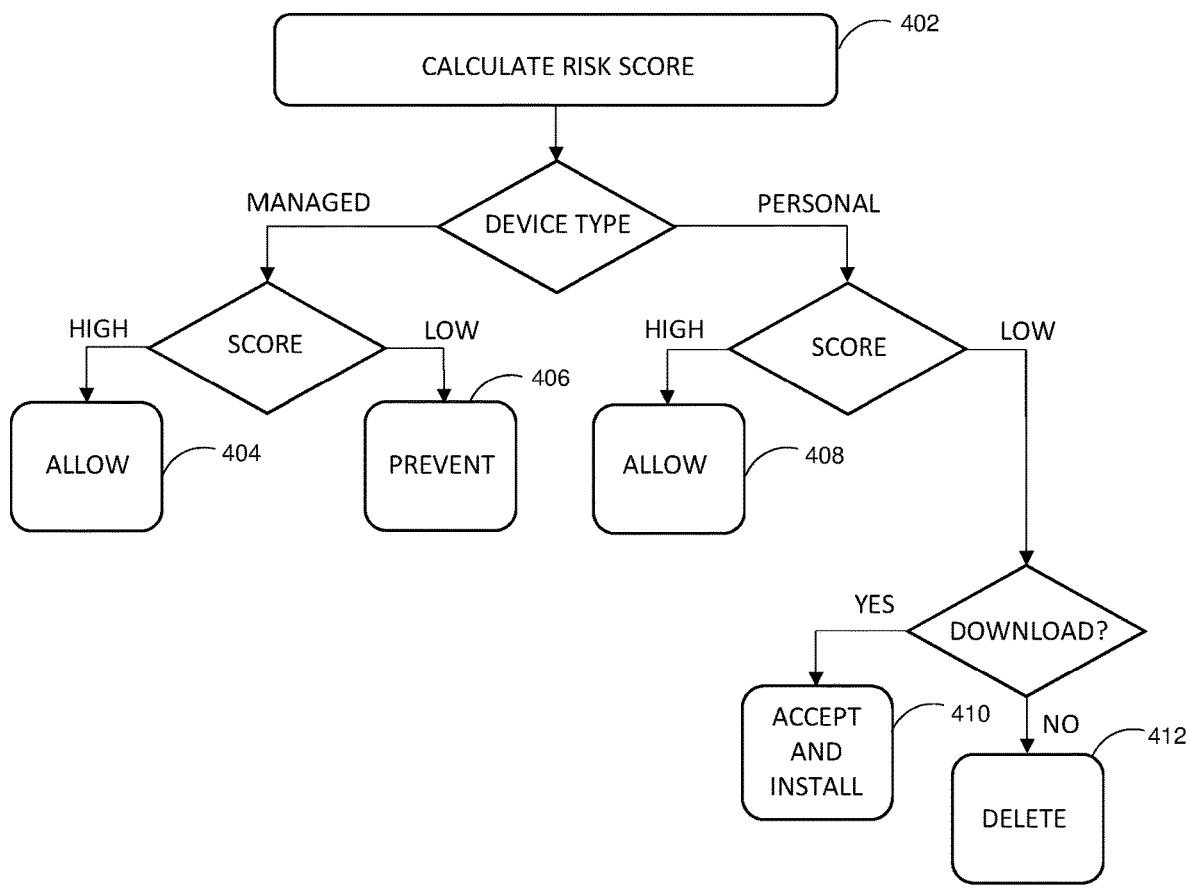
FIG. 4 depicts a flowchart of a method for implementing a download decision in accordance with one embodiment.

The download decision implemented by the decision module 134 may vary and may depend on the type of device requesting the download. FIG. 4 depicts a flowchart of a method 400 of implementing a download decision in accordance with one embodiment.

Step 402 involves calculating the risk score as discussed previously. The type of download decision implemented by the download decision module 134 may depend on the type of device. For example, the device may be managed by company security personnel, or it may be a personal device. Generally, managed devices may be subject to more heightened security precautions than personal devices.

Accordingly, if a calculated score for a file requested by a managed device is high, it may in some embodiments indicate there is a low risk associated with the file. In this scenario, method 400 may proceed to step 404, which involves allowing the managed device to download the file.

In another scenario, the calculated score for a file requested by a managed device may be low. This may indicate there is a high risk associated with the file. In this scenario, method 400 may proceed to step 406. Step 406 involves preventing the managed device from downloading the file. In this scenario, the user of the managed device may be presented with a message informing them that they cannot download the file due to the calculated risk score.

A score may be considered "low" if it is below some threshold value. For example, a risk score can be in the range of zero "0" to one hundred "100," and a score of below fifty "50" may be considered a low score. A score below 50 in this case may indicate there is a greater chance of the file being malicious than being non-malicious, for example. Similarly, a file with a score of ten may be more likely to be malicious than a file with a score of twenty. A risk score equal to or above 50 may be considered a "high" score. A score equal to or above 50 may indicate there is a greater chance of the file being non-malicious than being malicious. This discussion of scores, ranges, and interpretations is presented by way of example only, and other methodologies of calculating and interpreting risk scores may be used in accordance with the embodiments herein.

In other scenarios, the method 400 may involve a personal device. If a calculated score for a file requested by a personal device is high, it may in some embodiments indicate there is a low risk as associated with the file. In this scenario, method 400 may proceed to step 408, which involves allowing the personal device to download the file.

In another scenario, a calculated score for a file requested by personal device may be low. This may indicate there is a high risk associated with the file. As personal devices may not be subject to the same security requirements as managed devices, a user of the personal device may still be able to download the file. The user may be presented with a prompt to confirm they would like to continue with the installation notwithstanding the risk. For example, the prompt may present the score to the user along with a message asking if the user still wants to download the file. If yes, method 400 may proceed to step 410 which involves the user accepting the risk and downloading the file. Alternatively, the user may decide to not downloading the file. In this case method 400 may proceed to step 412 which, may involve deleting the file.

Figure 5:
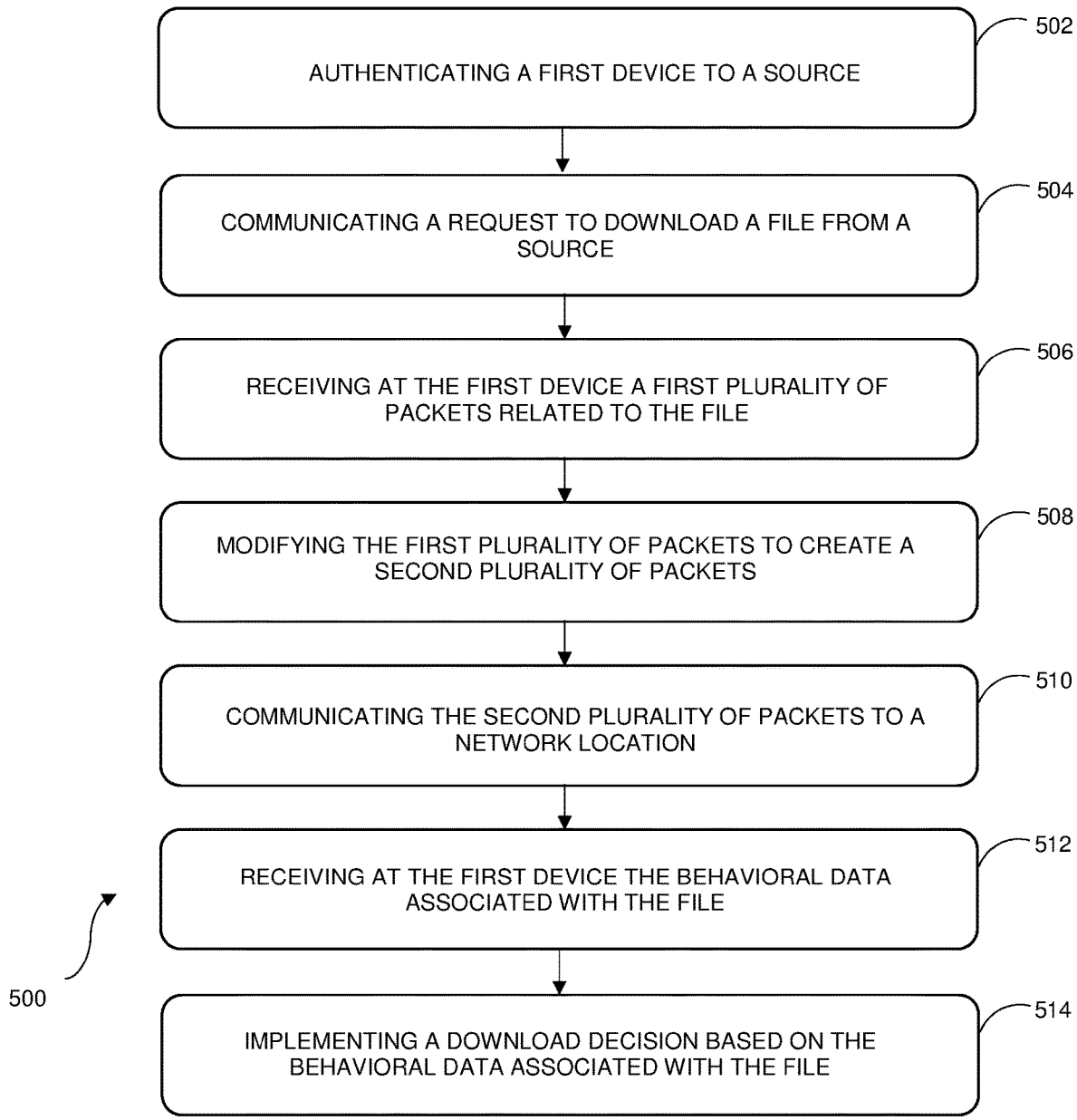
FIG. 5 depicts a flowchart of a method for monitoring network activity in accordance with one embodiment.

FIG. 5 depicts a flowchart of a method 500 for monitoring a file download in accordance with one embodiment. Components of the threat management facility 100, the enterprise facility 102 of FIG. 1, or both, may perform the steps involved in method 500.

Step 502 involves authenticating a first device 16 to a source 208. The first device 16 or a user thereof may provide to the source 208 credentials such as a username, password, or other type of data required for authentication. As discussed above in conjunction with FIG. 2, a source 208 may require the first device 16 to be authenticated before, for example, allowing the first device 16 to receive a file from the source 208.

Step 504 involves communicating, using the first device 16, a request to download a file from the source 208. For example, the first device 16 may issue a GET request to download a file from a source 208 as a website or a browser.

Step 506 involves receiving at the first device 16 a first plurality of packets related to the file. The first device 16 may include an agent 204 configured to intercept communications from the source 208. When the file is being downloaded, the risk agent 204, which is installed on the first device 16 with root privileges, may intercept traffic associated with the file download. As discussed above, this traffic may include packets associated with the requested file. The first plurality of packets may include connection data including an internet protocol (IP) address associated with the source 208, a file name, or domain name associated with the file, or the like.

Step 508 involves modifying the first plurality of packets to create a second plurality of packets. For example, the first device 16 may modify the Source and Destination attributes of the packets. That is, the agent 204 may update the value of the Source attribute of a packet to be the address of the first device 16, and may update the value of the Destination attribute of the packet to be the address of the second device 100. Additionally, the first device 16 may extract the payload from each of the first plurality of packets and drop the packets.

Step 510 involves communicating the second plurality of packets to a second device 100. The first device 16 may insert the payloads extracted from the first plurality of packets into the second plurality of payloads.

The second device 100 may refer to the threat management facility 100 of FIG. 1 or a server associated therewith. For example, the second device 100 may be a server configured to reassemble the second plurality of packets, extract the file from the reassembled second plurality of packets, and obtain behavioral data associated with the file. For example, the second device 100 may execute one or more of the risk score module 132, the sandbox environment 214, and the download decision module 134.

The second device 100 may therefore analyze the reassembled file to obtain data regarding how it behaves. This analysis may involve executing the file in the sandbox environment 214 as discussed previously and in conjunction with method 600 of FIG. 6, discussed below.

Step 512 involves receiving at the first device 16 the behavioral data associated with the file. The behavioral data may include a risk score that represents whether—and to what degree—the file is malicious or at least likely malicious.

Step 514 involves implementing a download decision based on the behavioral data associated with the file. The implemented download decision may indicate at least whether the first device downloads the file. For example, in some embodiments, the first device 16 may present the risk score to a user of the first device 16, and the user may provide an input regarding whether they would like to download the file. If the user provides confirmation that they would like to proceed with the download, the first device 16 may download the file. For example, the first device 16 may download the file from the second device 100.

In other embodiments, the user of the first device 16 may indicate they do not want to proceed with the download. For example, the risk score may indicate the file is malicious or at least likely malicious. Accordingly, the risk score may deter the user from downloading the file, and the user may provide an input indicating they do not want to download the file.

Figure 6:
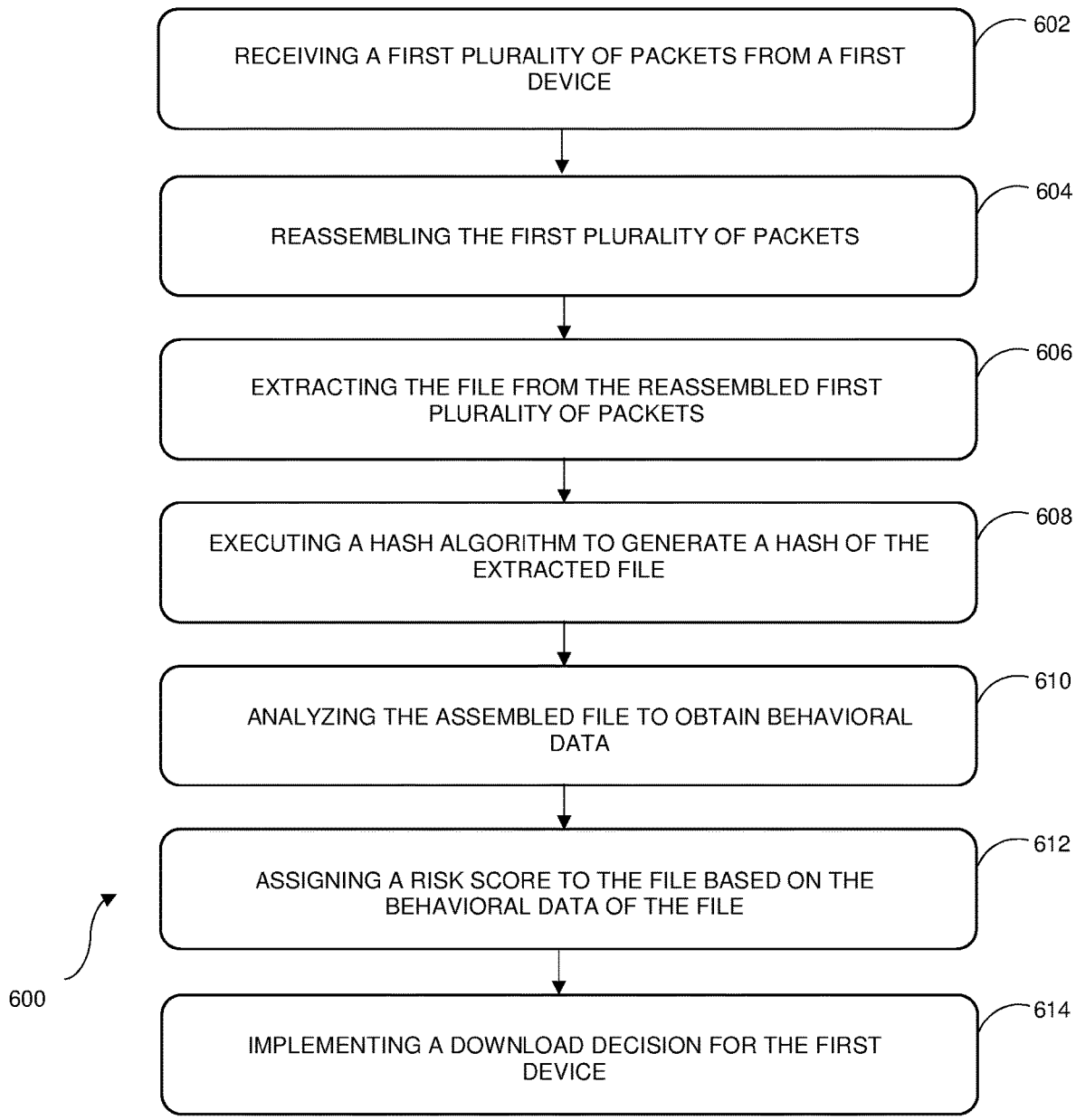
FIG. 6 depicts a flowchart of a method for monitoring network activity in accordance with another embodiment.

FIG. 6 depicts a flowchart of a method 600 for monitoring a file download in accordance with another embodiment. The components of the threat management facility 100, the enterprise facility 102, or both, may perform one or more the steps involved in method 600.

Step 602 involves receiving at an interface 210 a first plurality of packets from a first device 16. The first plurality of packets are associated with a file requested to be downloaded from a source 208 by the first device 16.

The first plurality of packets received in step 602 may refer to packets that have been previously modified by the first device 16. That is, the first device 16 may receive packets as part of a file download, modify the packets, and provide these modified packets to the second device 100. Accordingly, in the context of method 600, the first plurality of packets may refer to the packets sent by the first device 16 and received at the second device 100.

Step 604 involves reassembling the first plurality of packets. For example, the network communication module 212 may reassemble the packets received in step 602 in an appropriate order. Step 606 then involves extracting, using the network communication module 212, the file from the reassembled first plurality of packets.

Step 608 involves executing a hash algorithm to generate a hash of the extracted file. Step 608 may further include comparing the generated hash to at least one stored hash. For example, the network communication module 212 may compare the generated hash to one or more hashes stored in database 220. The stored hashes may represent known files. If there is a match, the embodiments herein may conclude that the requested file is similar to or is the same as a known file. If the stored hash is similar to or the same as a legitimate or otherwise benign file, the embodiments herein may conclude the requested file is legitimate and may allow the download.

In some embodiments, there may not be a match between the generated hash and a stored hash. Upon determining there is not a match between the generated hash and a stored hash, the method 600 may proceed to step 610.

Step 610 involves analyzing, using one or more processors executing instructions stored on memory, the assembled file to obtain behavioral data associated with the file. For example, step 610 may involve executing the file in the sandbox environment 214, for example.

The obtained behavioral data may relate to features or properties associated with the file or associated applications. These may include static features, such as the type of file, a reputation of a domain associated with the file, characteristics of assembly code associated with the file such as whether the code follows standard or otherwise accepted practices of code writing, metadata associated with the file, or the like.

The behavioral data may include dynamic features, such as function calls, whether the file or its associated applications have network access, whether an application attempts to exfiltrate data, or the like. The behavioral data may include some combination of static features and dynamic features.

Step 612 involves assigning, using the one or more processors, a risk score to the file based on the behavioral data of the file. Method 600 therefore detects whether and to what extent a file is malicious before it is downloaded by the first device 16. The risk score may be calculated in any one or more of a variety of ways such as those discussed previously.

Step 614 involves implementing, using the one or more processors, a download decision for the first device based on the assigned risk score. The download decision may indicate at least whether the first device is able to download the application.

The implemented download decision may be based on the risk score exceeding a threshold score. In some embodiments, such as in scenarios in which the first device 16 is a personal device, step 614 may involve presenting the risk score to the first device 16 and requesting confirmation from a user of the first device 16 to download the application. If the user wants to proceed with the download, step 614 may further involve receiving an input from a user of the first device 16 providing confirmation to download the file.

An administrator associated with an enterprise facility or a threat management facility may define a threshold risk score value to distinguish between acceptable risk scores and unacceptable risk scores. For example, an administrator may define a threshold score such that calculated risk scores above the threshold score are considered safe and calculated risk scores below the threshold score are considered prohibitively dangerous or otherwise unsafe. Alternatively, the threshold score may be defined such that scores below the threshold score are considered safe, and calculated scores above the threshold score are considered prohibitively dangerous or otherwise unsafe.

As discussed above, in some instances it is possible to detect whether a file is malicious only after it has been downloaded to a device. By this time, the file or associated applications may have already started performing malicious activity in furtherance of a malware campaign. For example, an application may immediately attempt to contact a command-and-control server or begin exfiltrating data.

The embodiments herein provide novel advantages in the technical field of malicious activity detection. The embodiments herein ensure that a user device (such as the mobile device 16), and potentially its associated network or other devices thereon, are not at risk from malicious activity resultant from a malicious. Specifically, the embodiments herein perform an analysis of a requested file at a secure environment that is separate from a user device before the file is downloaded by the user device.

If the analysis of the file in the secure environment suggests the application is malicious or is at least likely malicious, the embodiments herein may prevent the file from being downloaded by the user device. This ensures the user device can continue to function as intended and without being impacted by malicious activity. The embodiments herein therefore preserve computing resources as resources are not required to, for example, remediate the effects of malicious activity.

Similarly, devices such as the mobile device 16 have limited resources. By analyzing the file at separate location, the embodiments herein allow the user device 16 to allocate its resources towards other functions, and not to performing the file analysis described above.

The described embodiments are file-, device-, and platform-agnostic. That is, because the file analysis is conducted in a secure environment separate from the user device, the embodiments herein can analyze any type of file requested by any type of device. Accordingly, the embodiments herein may protect a wide range of devices and from a wide range of malicious file types.

In one aspect, embodiments relate to a method for monitoring a file download. The method includes communicating, using a first device, a request to download a file from a source; receiving at the first device a first plurality of packets related to the file; modifying the first plurality of packets to create a second plurality of packets; communicating the second plurality of packets to a second device configured to reassemble the second plurality of packets, extract the file from the reassembled second plurality of packets, and obtain behavioral data associated with the file; receiving at the first device the behavioral data associated with the file; and implementing a download decision based on the behavioral data associated with the file, wherein the implemented download decision indicates at least whether the first device downloads the file.

In some embodiments, the method further includes authenticating the first device to the source, wherein the first plurality of packets is received after the first device authenticates to the source.

In some embodiments, receiving the behavioral data associated with the file includes receiving a risk score, and implementing the download decision includes presenting the risk score to a user of the first device, receiving an input from the user providing confirmation to download the file, and enabling the first device to download the file upon receiving the provided confirmation.

In some embodiments, receiving the behavioral data associated with the file includes receiving a risk score, and implementing the download decision includes presenting a risk score to a user of the first device, receiving an input from the user of the first device to not download the file, and preventing the first device from downloading the file.

In some embodiments, the first plurality of packets includes connection data including an internet protocol (IP) address associated with the source, a file name, or domain name associated with the file.

In some embodiments, the method further includes installing an agent on the first device and enabling the agent to intercept network traffic from the source.

In some embodiments, modifying the first plurality of packets to create the second plurality of packets includes modifying a source IP address of a first packet of the first plurality of packets, modifying a destination IP address of the first packet, and communicating at least a second packet using the modified source IP address and the modified destination IP address.

In some embodiments, the method further includes extracting a payload from the first plurality of packets, inserting the extracted payload into the second plurality of packets, and dropping the first plurality of packets.

According to another aspect, embodiments relate to a method for monitoring a file download. The method includes receiving at an interface a first plurality of packets from a first device, wherein the first plurality of packets are associated with a file requested to be downloaded from a source by the first device; reassembling the first plurality of packets; extracting the file from the reassembled first plurality of packets; analyzing, using one or more processors executing instructions stored on memory, the assembled file to obtain behavioral data associated with the file; assigning, using the one or more processors, a risk score to the file based on the behavioral data of the file; and implementing, using the one or more processors, a download decision for the first device based on the assigned risk score, wherein the download decision indicates at least whether the first device is able to download the application.

In some embodiments, the source is a third-party browser requiring authentication by the first device.

In some embodiments, the method further includes executing a hash algorithm to generate a hash of the extracted file, comparing the generated hash to at least one stored hash, and determining whether the generated hash matches the at least one stored hash, wherein the file is executed at a secure environment upon determining the generated hash does not match the at least one stored hash.

In some embodiments, the first plurality of packets includes connection data including an internet protocol (IP) address associated with the source, a name of the file, or a domain name associated with the file.

In some embodiments, implementing the download decision includes preventing the first device from downloading the file.

In some embodiments, implementing the download decision includes presenting the risk score to a user of the first device, requesting confirmation from the user of the first device to download the file, receiving an input from the user of the first device providing confirmation to download the file, and enabling the first device to download the file upon receiving confirmation to download the file.

In some embodiments, the implemented download decision is based on the risk score exceeding a threshold.

According to yet another aspect, embodiments relate to a computer program product for monitoring a filed download. The computer program product includes computer executable code embodied in one or more non-transitory computer readable media that, when executing on one or more processors, performs the steps of: receiving at an interface a first plurality of packets from a first device, wherein the first plurality of packets are associated with a file requested to be downloaded from a source by the first device; reassembling the first plurality of packets; extracting the file from the reassembled first plurality of packets; analyzing, using one or more processors executing instructions stored on memory, the assembled file to obtain behavioral data associated with the file; assigning, using the one or more processors, a risk score to the file based on the behavioral data of the file to determine whether the file is malicious; and implementing, using the one or more processors, a download decision for the first device based on the assigned risk score, wherein the download decision indicates at least whether the first device is able to download the application.

In some embodiments, the source is a third-party browser requiring authentication by the first device.

In some embodiments, the computer program product further comprises computer executable code that, when executing on one or more processors, performs the steps of executing a hash algorithm to generate a hash of the extracted file; comparing the generated hash to at least one stored hash; and determining whether the generated hash matches the at least one stored hash, wherein the file is executed at a secure environment upon determining the generated hash does not match the at least one stored hash.

In some embodiments, implementing the download decision includes preventing the first device from downloading the file.

In some embodiments, the implemented download decision is based on the risk score exceeding a threshold.

In some embodiments, the computer program product further comprises computer executable code that, when executing on one or more processors, performs the steps of presenting the risk score to the first device, requesting confirmation from a user of the first device to download the application, receiving an input from a user of the first device providing confirmation to download the application, and enabling the first device to download the application upon receiving confirmation to download the application.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for monitoring a file download, the method comprising:
   communicating, using a first device, a request to download a file from a source;
   receiving at the first device a first plurality of packets related to the file;
   modifying the first plurality of packets to create a second plurality of packets;
   communicating the second plurality of packets to a second device configured to:
      reassemble the second plurality of packets,
      extract the file from the reassembled second plurality of packets,
      obtain behavioral data associated with the file;
   receiving at the first device the behavioral data associated with the file;
   implementing a download decision based on the behavioral data associated with the file, wherein the implemented download decision indicates at least whether the first device downloads the file;
   executing a hash algorithm to generate a hash of the extracted file;
   comparing the generated hash to at least one stored hash; and
   determining whether the generated hash matches the at least one stored hash, wherein the file is executed at a secure environment based on determining that the generated hash does not match the at least one stored hash.

2. The method of claim 1 further comprising authenticating the first device to the source, wherein the first plurality of packets is received after the first device authenticates to the source.

3. The method of claim 1 wherein receiving the behavioral data associated with the file includes receiving a risk score, and implementing the download decision includes:
   presenting the risk score to a user of the first device,
   receiving an input from the user providing confirmation to download the file, and enabling the first device to download the file upon receiving the provided confirmation.

4. The method of claim 1 wherein receiving the behavioral data associated with the file includes receiving a risk score, and implementing the download decision includes:
   presenting a risk score to a user of the first device,
   receiving an input from the user of the first device to not download the file, and
   preventing the first device from downloading the file.

5. The method of claim 1 wherein the first plurality of packets includes connection data including an internet protocol (IP) address associated with the source, a file name, or domain name associated with the file.

6. The method of claim 1 further comprising:
   installing an agent on the first device, and
   enabling the agent to intercept network traffic from the source.

7. The method of claim 1 wherein modifying the first plurality of packets to create the second plurality of packets includes:
   modifying a source IP address of a first packet of the first plurality of packets,
   modifying a destination IP address of the first packet, and
   communicating at least a second packet using the modified source IP address and the modified destination IP address.

8. The method of claim 1 further comprising:
   extracting a payload from the first plurality of packets,
   inserting the extracted payload into the second plurality of packets, and
   dropping the first plurality of packets.

9. A method for monitoring a file download, the method comprising:
   receiving at an interface a first plurality of packets from a first device, wherein the first plurality of packets are associated with a file requested to be downloaded from a source by the first device;
   reassembling the first plurality of packets;
   extracting the file from the reassembled first plurality of packets;
   analyzing, using one or more processors executing instructions stored on memory, the assembled file to obtain behavioral data associated with the file;
   assigning, using the one or more processors, a risk score to the file based on the behavioral data of the file to determine whether the file is malicious;
   implementing, using the one or more processors, a download decision for the first device based on the assigned risk score, wherein the download decision indicates at least whether the first device is able to download the application;
   executing a hash algorithm to generate a hash of the extracted file;
   comparing the generated hash to at least one stored hash; and
   determining whether the generated hash matches the at least one stored hash, wherein the file is executed at a secure environment based on determining that the generated hash does not match the at least one stored hash.

10. The method of claim 9 wherein the source is a third-party browser requiring authentication by the first device.

11. The method of claim 9 wherein the first plurality of packets includes connection data including an internet protocol (IP) address associated with the source, a name of the file, or a domain name associated with the file.

12. The method of claim 9 wherein implementing the download decision includes preventing the first device from downloading the file.

13. The method of claim 9 wherein implementing the download decision includes:
    presenting the risk score to a user of the first device,
    requesting confirmation from the user of the first device to download the file,
    receiving an input from the user of the first device providing confirmation to download the file, and
    enabling the first device to download the file upon receiving confirmation to download the file.

14. The method of claim 9 wherein the implemented download decision is based on the risk score exceeding a threshold.

15. A computer program product for monitoring a filed download, the computer program product comprising computer executable code embodied in one or more non-transitory computer readable media that, when executing on one or more processors, performs the steps of:
    receiving at an interface a first plurality of packets from a first device, wherein the first plurality of packets are associated with a file requested to be downloaded from a source by the first device;
    reassembling the first plurality of packets;
    extracting the file from the reassembled first plurality of packets;
    analyzing, using one or more processors executing instructions stored on memory, the assembled file to obtain behavioral data associated with the file;
    assigning, using the one or more processors, a risk score to the file based on the behavioral data of the file to determine whether the file is malicious;
    implementing, using the one or more processors, a download decision for the first device based on the assigned risk score, wherein the download decision indicates at least whether the first device is able to download the application;
    executing a hash algorithm to generate a hash of the extracted file;
    comparing the generated hash to at least one stored hash; and
    determining whether the generated hash matches the at least one stored hash, wherein the file is executed at a secure environment based on determining that the generated hash does not match the at least one stored hash.

16. The computer program product of claim 15 wherein the source is a third-party browser requiring authentication by the first device.

17. The computer program product of claim 15 wherein implementing the download decision includes preventing the first device from downloading the file.

18. The computer program product of claim 15 wherein the implemented download decision is based on the risk score exceeding a threshold.

* * * * *